Nov. 6, 1934.  J. J. SHOEMAKER ET AL  1,979,353
GROUP FEED DISTRIBUTION SYSTEM
Filed May 23, 1931
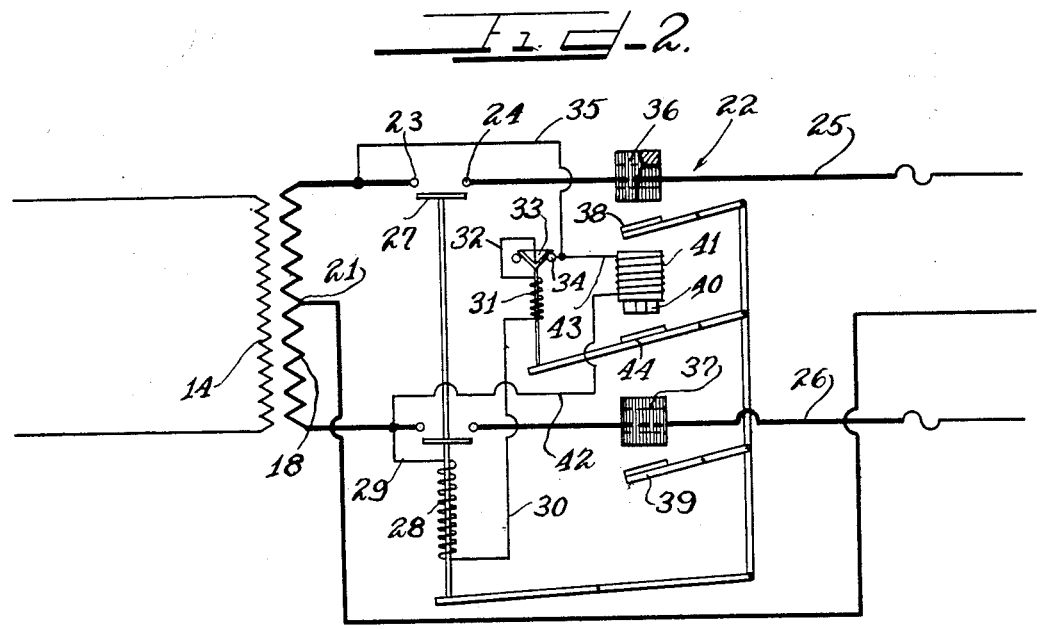
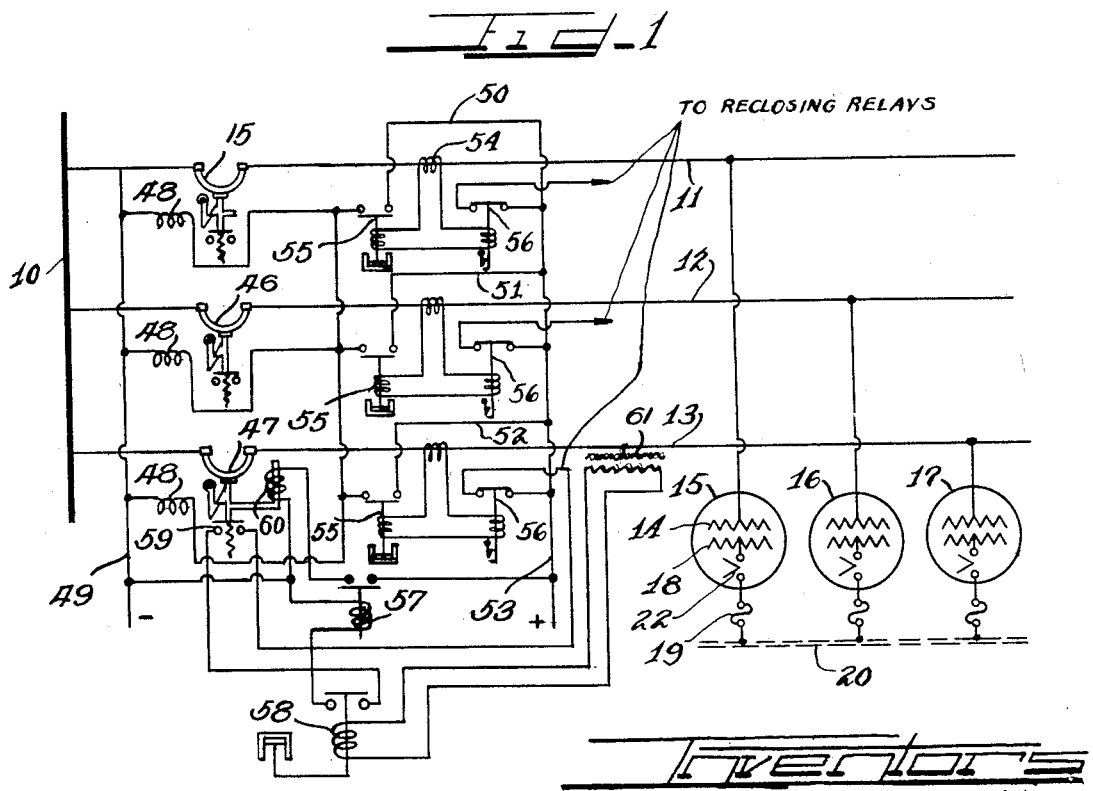
Inventors
Joseph J. Shoemaker.
Richard E. Schwarz.

UNITED STATES PATENT OFFICE 1,979,353

GROUP FEED DISTRIBUTION SYSTEM

Joseph J. Shoemaker, Clawson, and Richard E. Schwarz, Royal Oak, Mich.

Application May 23, 1931, Serial No. 539,618

21 Claims. (Cl. 175—294)

This invention relates to improvements in alternating current systems of distribution.

Alternating current systems of distribution have been suggested wherein a secondary network is fed by a plurality of step down transformers, a number of transformers being connected to each individual primary supply circuit. In these systems a variety of schemes has been used for protecting the network, and in the main, it has been the usual practice to connect the transformers to the network through some form of low voltage circuit breaker and provide a more or less complicated system of reverse current relays for tripping these secondary circuit breakers and thereby disconnect the faulty primary supply and its transformers from the network. Moreover, circuit breakers were also installed in each primary circuit adjacent the energy source, whereby the faulty primary circuit could also be disconnected from the energy source.

In systems arranged as just described, a fault in one of the primary circuits, such as a short circuit, would be fed from the primary source of energy through the circuit breaker in the faulty line and also would be fed from the network through the circuit breakers in the secondary connections of the transformers connected to the faulty line. Since the current from the network is supplied by two or more primary sources feeding through their transformers, the back feed current into the fault will be very high and therefore each of these secondary circuit breakers must necessarily be of the type which is designed for opening very severe "short circuits", that is, the circuit breakers must have very high current interrupting capacity (about 20 to 30 times full load rating). This requirement is disadvantageous in that not only is the original investment increased over that for secondary disconnecting switches, which require no rupturing capacity, but there must also be frequent inspections and repairs made to the secondary circuit breaker contacts which connect and disconnect the transformers to the network, to assure the proper operation of these switches during times of trouble.

Further, the proposed systems are objectionable in that the relays for tripping the circuit breakers in the secondaries of the transformers are delicately constructed, require current transformers, and present a possible source of trouble. These relays must also be frequently inspected to assure positive and proper operation during times of trouble.

To overcome the foregoing disadvantages and objections inherent in the suggested alternating current distribution systems, the present invention contemplates the provision of a network system supplied by a plurality of step downtransformers which derive their primary potentials from a common source or separate fuses through individual feeder circuits which are arranged for operation as a group; in which all the transformers and their primary feeder circuits are automatically disconnected from the energy source and the network upon the occurrence of a fault in any one of the primary feeder circuits, the disconnection from the low voltage network occurring after the disconnection from the energy source; in which the faulty circuit and its transformers are locked against being reconnected until desired; and in which the other primary circuits are automatically re-established after a brief interval, the secondaries of the transformers in these circuits being automatically connected to the low voltage network when these circuits are reclosed and their transformers energized.

The principal application of the group feed distribution system is in an area where the low density is not large enough to justify an entire underground network, and where the use of overhead transformers and secondary lines is permitted. However, to feed this load with the ordinary radial system a number of underground ties are required which mean that the service will be subject to long interruptions of an hour or more in case of a failure of any cable connected to the primary feeder.

Since the transformers in the group feed system would be mounted on poles in most cases, it is very important that the equipment be rugged and free from devices that will become damaged in service, or will need frequent inspection and testing, and will not complicate pole construction. The switch as designed and built can be mounted in the top of a standard distribution transformer, below the oil level, and will not require any additional apparatus to be mounted on the present poles, which would tend to complicate the usual type of overhead construction.

The disconnecting switch has a special feature which holds it closed during short circuit conditions, so there is no possibility of it opening under high current and burning its contacts. This will mean that in service the switch will only need to be examined and tested once a year when the transformer is inspected, and will have no delicate relays to get out of adjustment, no current transformers that might give trouble, and replacing of contact parts will not be necessary.

In a network system with automatic secondary circuit breakers, when a fault occurs on the primary of one feeder the network voltage in a large part of the area will fall to 50 per cent or lower, for a period of about 10 cycles, which is sufficient to cause motors to fall off the line and cause a noticeable dip in the lights.

In the group feed system as described a limited area will be interrupted for about 1½ seconds, which should not be an inconvenience to customers who with the ordinary radial system are interrupted 30 seconds or more when a primary switch opens, and will have an interruption of an hour or more in the case of a primary cable fault.

The group feed system will make it possible to give very dependable service from two or more primary sources with interruptions of not over 1½ seconds caused by primary cable trouble. The added investment in secondary switches will be small compared with network protectors and relays. No complicated pole construction will be necessary, as no external equipment is added. No extra inspection, testing or maintenance will be required other than that which is necessary with the present system of radial feeders and overhead transformers.

Other objects of this invention will more fully appear from the following detail description taken in connection with the accompanying drawing which illustrates a single embodiment thereof, and in which Figure 1 shows diagrammatically a distribution system embodying the features of our invention, particularly the electrical connections of the instrumentalities disposed adjacent the energy source for controlling the primary feeder circuits; and Figure 2 shows diagrammatically the instrumentalities for opening and closing the secondary connections from the transformers to the network distribution system.

As shown on the drawing:

In the illustrated embodiment of our invention, we have shown in Figure 1 a high voltage bus 10 which may be located in a sub-station or central generating plant. Connected to this bus are a plurality of primary feeder circuits 11, 12 and 13 which are, respectively, connected to the high voltage windings 14 of step down transformers 15, 16 and 17. The low voltage windings 18 of these transformers are respectively connected through suitable protective devices 19, which may be fuses, to a common secondary distribution network 20. In this arrangement, it will be observed that a plurality of multiple feeder circuits are provided from the bus 10 to the network.

For clearness, our improved system has been shown in Figure 1 in the form of a one-line diagram. It will be appreciated by those skilled in the art, that the distribution may be single phase or multi-phase without departing from the scope of our invention. It is also contemplated that the network distribution system may be either two wire or three wire. In the latter case the common wire is connected at the mid-point of the transformer secondary, as shown at 21 in Figure 2.

In our present embodiment, we provide as means for opening and closing the secondary leads of each transformer, a disconnecting switch as generally indicated at 22 in Figure 1. For this purpose, we prefer to use a switch such as described in our co-pending application, Serial No. 541,776, filed June 3, 1931. This switch is diagrammatically shown in Figure 2 and in general comprises spaced main contacts 23 and 24 which are disposed in the secondary transformer connections 25 and 26. These contacts are cooperatively engageable by a movable bridging contact 27 which is actuated by means of a closing coil 28 connected so as to be energizable directly from the secondary winding 18 of the transformer through the following circuit: from one terminal of the winding 18 through conductor 29 to one terminal of the coil 28, from the other terminal of the coil 28 through conductor 30, blow out coil 31 of an auxiliary switch, conductor 32, movable contact 33 of the auxiliary switch, stationary contact 34 of the auxiliary switch and conductor 35 to the other terminal of the transformer winding 18.

For interlocking the main switch contacts in closed position, there is provided a mechanism having current and potential elements which are arranged to be responsive to the current and voltage on the conductors 25 and 26. The current elements of this interlocking mechanism comprise laminated cores 36—37 through which the conductors 25 and 26 are respectively carried, so that when current is flowing in these conductors the cores become magnetized and attract their associated armatures 38 and 39. The potential element of the interlocking mechanism comprises a magnetic core 40 which is operatively associated with a winding 41 having one end connected through conductor 42 to one terminal of the transformer winding 18 and the other end connected through conductors 43 and 35 to the other terminal of the transformer winding 18. Energization of the winding 41 will magnetize the core 40 and attract its associated armature 44 and will hold armatures 38 and 39 up and in contact with cores 36 and 37. The armatures 38, 39 and 44 are connected to a common linkage which is arranged in such a manner that the main switch contacts will be held in closed position at all times when any one or all of these armatures are attracted by their associated magnets, and will enable the contacts to open only when the armatures are not attracted by their magnets. Energization of either the voltage or current elements of the interlocking mechanism will open the contacts of the auxiliary switch, the movable contact 33 of this switch being electrically connected in series with coil 28 and mechanically connected to and actuated through the common linkage of the armatures 38, 39 and 44 and at the same time latch the main contacts 23, 27, 24 and hold the switch closed.

At the sub-station or central generating plant, the primary feeder circuits 11, 12 and 13 are respectively provided with suitable circuit breakers 45, 46 and 47 which are preferably closed and opened electrically. In order to simplify the description of our invention, the wiring connections for effecting closure of these breakers have not been shown, since they are well understood by those familiar with the art.

Each circuit breaker is arranged for tripping by energizing an associated tripping coil 48. The tripping coils of the breakers 45, 46 and 47 are connected in multiple with one set of commonly connected terminals connected to one side 49 of a control circuit. The other set of commonly connected terminals of the tripping coils are connected through multiple circuits 50, 51 and 52 to the other side 53 of the control circuit, these multiple circuits being respectively associated with the protective equipment of the feeder circuits 11, 12 and 13. The protective equipment for each of the primary feeder circuits is shown as composed of instrumentalities arranged to operate on overload, although it is contemplated that protective equipment arranged to operate in response to other abnormal conditions in the feeder circuits may be included without departing from the spirit and scope of our invention. Specifically, we have shown for each feeder circuit a current transformer 54 having connected in series across its terminals the operating coils of an overload relay 55 with time delay and a lockout relay 56. The contacts of the overload relays, which are normally open, are respectively disposed in the multiple circuits 50, 51 and 52; and the contacts of the lockout relays, which are normally closed, are respectively disposed in individual circuits from the side 53 of the control circuit, each of the individual circuits being connected to automatic reclosing relays.

In order that the operation of the system of the present invention may be more clearly understood, the reclosing relay equipment for one of the primary feeder circuit breakers is shown in Figure 1, for example, circuit breaker 47. Since the reclosing equipment is duplicated for each feeder circuit breaker, it is thought that it will not be necesssary to show this equipment in detail for each of the feeder circuit breakers.

The reclosing equipment embraces a relay 57 having normally open contacts and a time delay closing relay 58 having contacts which are closed when its actuating coil is deenergized. The coil of relay 57 is energized through the following circuit: from the side 53 of the control circuit, contacts of relay 56, circuit breaker auxiliary contacts 59, contacts of relay 58 to one terminal of the coil of relay 57 and from the other terminal of this coil to the side 49 of the control circuit. The closing coil 60 of the circuit breaker has one terminal connected through the contacts of relay 57 to the side 53 of the control circuit and its other terminal connected directly to the side 49 of the control circuit. The actuating coil of relay 58 is energized directly from a transformer 61 connected to the primary feeder circuit.

The operation of our system will be as follows:

Assuming that the system is operating normally and that energy is being fed from the bus 10 in the sub-station or central generating plant over the primary feeder circuits 11, 12 and 13, and through a number of transformers 15, 16, 17, etc., to the secondary network system 20. Under these conditions the bridging contacts 27 will be in engagement with the stationary contacts 23 and 24, and the armatures 38, 39 and 44 will be held up in contact with cores 36, 37 and 40, due to the fact that coil 41 is energized and holds up its armature 44 which is connected to a shaft common to all the armatures, which will maintain the common linkage mechanism so as to mechanically interlock the main switch contacts in closed position and contact 33 of the auxiliary switch disengaged from contact 34, thereby causing the closing coil 28 to be deenergized during normal operation.

Let it now be assumed that a short circuit occurs in a primary feeder circuit, for example, feeder circuit 12. This short circuit will cause an increased current to flow through the current transformer 54 therein with the result that the associated overload relay 55, after suitable time delay, will close its contacts and the lockout relay 56 will open its contacts. Closing of the contacts of the overload relay will connect the side 53 of the control circuit through conductor 51 to one set of interconnected terminals of the trip coils 48, and since the other set of terminals of the trip coils are connected to the other side of the control circuit 49, the circuit breakers 45, 46 and 47 will be opened, thereby interrupting the flow of energy from the bus 10 to the network system 20.

Referring now to Figure 2, as soon as the short circuit occurs the network voltage will drop to about 50% normal or less, but the current passing through the conductors 25 and 26 will be quite high. This will energize cores 36 and 37 which will attract armatures 38 and 39, thus holding the interlocking mechanism in place and keeping the main contacts 23, 27, 24 closed. This low voltage across coil 41 would allow its armature 44 to drop out and unlatch the main contacts, badly burning them, if it were not held in place by the action of cores 36 and 37 on the common shaft between them which will not allow the interlock mechanism to unlatch, until the current has dropped to a safe low value that the disconnect switch can open without damage to its main contacts 23, 27, 24. As soon as the primary circuits 11, 12 and 13 are opened and the network deenergized, each of the disconnecting switches 22 associated with the transformers 15, 16, 17, etc., will immediately open by virtue of the cores 36, 37 and 40 becoming demagnetized, thereby releasing their armatures which actuate the common linkage connection thereto so as to enable the main contacts to assume open position. This action of the interlocking mechanism also reestablishes the movable contact 33 of the auxiliary switch in engagement with the stationary contact 34.

After a predetermined interval of time (about 1½ seconds) the reclosing relays function to reclose the circuit breakers 45, 46 and 47, but since the reclosing circuits of these breakers are through the lockout relays, circuit breaker 46 cannot reclose, since the contacts of the lockout relay for feeder circuit 12 are open. Circuit breakers 45 and 47 will therefore be closed and the primary windings of transformers 15 and 17 again energized. The disconnecting switch associated with each of these transformers will now automatically close by virtue of the closing coil 28 being energized from the terminals of the secondary winding 18, through the following circuit: from one terminal of winding 18, conductor 29 to one terminal of the closing coil 28, from the other terminal of coil 28 through conductor 30, blowout coil 31, conductor 32, contacts 33 and 34, and conductor 35 to the other terminal of winding 18. The coil 41 is also energized through the following circuit: from one terminal of winding 18 through conductor 42 to one terminal of coil 41, from the other terminal of coil 41 through conductors 43 and 35 to the other terminal of winding 18. Energizing of the coil 41 will cause its armature 44 to be attracted with the result that contacts 33 and 34 are separated to interrupt the circuit to the closing coil 28 of the main switch. Naturally, as the contacts 33 and 34 are separated an arc will be formed. The blowout coil 31, however, will still carry current as long as the arc continues and the flux set up by the blowout coil will cause a breaking of the arc between the contacts of the auxiliary switch. Movement of the armature 44 will also produce a corresponding movement of armatures 38 and 39 through their common linkage and bring them in contact with cores 36 and 37, this action at the same time mechanically locking the main switch contacts in closed position. Immediately upon closing the main switch, if there is an appreciable load or a short circuit on the secondary network, the armatures 38 and 39 will be held in raised position by magnets 36 and 37 respectively, whereby the main contacts are locked against opening until the current drops to a low value.

Service has now been restored after a short time delay to the network system through the primary feeder circuits 11 and 13 and transformers 15 and 17. It will be observed that since the circuit breaker 46 has not reclosed, the switch 22 associated with transformer 16 will remain open, the primary feeder 12 and transformer 16 thereby being disconnected from the bus 10 and network system respectively. Further, as soon as the fault has been repaired or remedied in the primary feeder circuit 12, the circuit breaker 46 may then be closed and the secondary of transformer 16 will be automatically connected, as described above, through its disconnecting switch 22 to the network system. In closing the circuit breaker 46, no regard will have to be taken of the phase relation existing between the circuits which are already in and the circuit which is being thrown in, since they are all fed from the same source.

Now, it is of course to be understood that, although we have described in detail the preferred embodiment of our invention, the invention is not to be thus limited but only insofar as defined by the scope and spirit of the appended claims.

We claim as our invention:

1. A distribution system comprising a plurality of feeder circuits, switches for the individual opening and closing of said circuits, means for tripping said switches to open all of said circuits upon the occurrence of a fault in one of said circuits, and means responsible solely to the opening of said circuits for reclosing substantially simultaneously the switches of the circuits which are free from faults after a predetermined interval of time.

2. A distribution system comprising a plurality of circuits arranged for group feed, switches for individually opening and closing the circuits, means for automatically tripping all of said switches upon the occurrence of a fault in any of said circuits, means for locking out the switches of the faulty circuits against reclosure, and means responsive solely to the opening of said circuits for reclosing substantially at the same time the switches of the circuits which are free from faults, after a predetermined interval of time.

3. A distribution system comprising a secondary network, a plurality of primary feeder circuits arranged for group operation, each of said circuits being connected to said secondary network through a number of step down transformers, and means for automatically and individually connecting and disconnecting each of the transformers to and from said network in response only to the load energization and load deenergization of the primary feeder circuit to which it is connected.

4. A distribution system comprising a secondary network, a plurality of primary feeder circuits arranged for group operation, each of said circuits being connected to said secondary network through a number of step down transformers, and means responsive only to voltage from the feeder circuit arranged to automatically connect each transformer to said network when its primary circuit is energized and disconnect the same from the network when its load current and voltage are reduced to a predetermined value.

5. A distribution system comprising a secondary network, a plurality of primary feeder circuits arranged for group operation, each of said circuits being connected to said secondary network through a number of step down transformers, a switch associated with each transformer for opening and closing its connection to said network, means for closing said switch energizable when the primary circuit of its associated transformer is energized, and an interlock for maintaining said switch closed so long as the load current and voltage on its associated transformer remain above a predetermined value.

6. A distribution system comprising a secondary network, a plurality of primary feeder circuits arranged for group operation, each of said circuits being connected to said secondary network through a number of step down transformers, a switch associated with each transformer for opening and closing its connection to said network, means for closing said switch energizable when the primary circuit of its associated transformer is energized, an interlock for maintaining said switch closed so long as the load current and voltage on its associated transformer remain above a predetermined value, and means for deenergizing the switch closing means as soon as the switch is closed.

7. A distribution system comprising a plurality of primary feeder circuits each connected through a switch to a common source of energy, a number of step down transformers having their high voltage windings respectively connected to said circuits and their low voltage windings connected to a common secondary network, automatic switch means in the low voltage connection of each transformer arranged to close and open when the transformer is energized and deenergized, means for tripping the primary switches when a fault occurs in any of said circuits and locking out the faulty circuits, and means for reclosing after a predetermined interval of time the primary switches of the circuits that are not locked out, whereby the secondary network is energized through the transformers in the reclosed circuits.

8. A distribution system comprising a plurality of parallel feeder circuits having a common source, switches for the individual opening and closing of said circuits relative to said source, means for tripping all of the switches upon the occurrence of trouble in one of said circuits, and means responsive to the deenergization of said circuits for simultaneously reclosing the circuits which are free from trouble after a predetermined time delay.

9. A distribution system comprising a plurality of feeder circuits, switches for the individual opening and closing of said circuits, means for tripping all of the switches upon the occurrence of trouble in one of said circuits, and time delay potential responsive means connected to said circuits, said latter means being deenergized when the circuits are deenergized, and means controlled by said latter means for closing the switches substantially at the same time.

10. In a self-contained distribution device, the combination of a transformer having primary and secondary leads with a disconnecting device comprising stationary contacts in the secondary leads of said transformer, movable contacts for bridging the stationary contacts, electro-responsive means for closing said contacts energizable from the secondary winding of the transformer, means for interlocking said contacts in closed position and deenergizing said electro-responsive means, said interlocking means being responsive to the energization of the secondary leads by the closing of said contacts, and means for causing said contacts to open when the current and voltage in the secondary leads fall to a predetermined value.

11. In combination with a transformer having primary and secondary leads, a disconnecting switch comprising stationary contacts in the secondary leads of the transformer, movable contacts for bridging the stationary contacts, electro-responsive means for closing said contacts energizable from the secondary winding of the transformer, means for interlocking said contacts in closed position and deenergizing said electro-responsive means, said interlocking means being responsive to the energization of the secondary leads by the closing of said contacts, and means for causing said contacts to open when the current and voltage in the secondary leads fall to a predetermined value.

12. A distribution system comprising a plurality of feeder circuits fed from a common source, and automatic means including a switch for controlling said circuits in such a manner that an abnormal condition in one of said circuits will cause the entire group to open substantially simultaneously, said means thereafter closing the fault-free circuits substantially simultaneously.

13. A distribution system comprising a plurality of feeder circuits individually fed from a common source, and automatic means insensitive to reverse flow of power within said circuits for controlling said circuits in such a manner that an abnormal condition in one of said circuits will cause the entire group to open substantially simultaneously, said means thereafter closing the fault-free circuits substantially simultaneously.

14. A distribution system comprising a secondary network, a plurality of primary feeder circuits arranged for group operation, each of said circuits being connected to said secondary network through a number of step down transformers, and means responsive only to voltage from the feeder circuits arranged to automatically connect each transformer to said network when its primary circuit is energized and disconnect the same from the network when its load current is reduced to a predetermined value.

15. In combination with a transformer having primary and secondary leads, means for automatically closing the electrical circuit to the secondary leads, when the primary of the transformer is energized and open said secondary leads when the current and voltage thereof reach a predetermined low value, said means being insensitive to reverse power flow and operative upon restoration of load voltage only.

16. In combination with a transformer having primary and secondary leads adapted for connection respectively to a supply source and load source, means including switches for closing the secondary lead, when the primary of the transformer is energized, and opening said leads when the current and voltage thereof reach a predetermined value, said means being actuated independently of the phase relationship existing between the transformer secondary voltage and the voltage of the load source, and operative upon restoration of load voltage only.

17. In combination with a transformer having primary and secondary leads adapted for connection respectively to a supply source and load source, means including switches for closing the secondary leads, when the primary of the transformer is energized and opening said leads when the current and voltage thereof reach a predetermined value, said means being actuated independently of a voltage difference between the transformer secondary voltage and the voltage of the load source, and operative upon restoration of load voltage only.

18. A distribution system comprising a plurality of feeder circuits connected to a common source of supply, a low-voltage network, transforming means in each of said circuits having its primary connected to said source and its secondary connected to said network, individual primary switches disposed on the primary side of the transforming means of each circuit, individual secondary switches disposed on the secondary side thereof, means to trip all the primary and secondary switches upon the occurrence of trouble in one of said circuits, and means responsive to the tripping of said switches for reclosing after a predetermined time delay the primary and secondary switches of the circuits which are free from trouble.

19. A distribution system comprising a plurality of feeder circuits connected to a common source of supply, a low voltage network, transforming means in each of said circuits having its primary connected to said source and its secondary connected to said network, individual primary switches disposed on the primary side of the transforming means of each circuit, individual secondary switches disposed on the secondary side thereof, means to initially trip all the primary switches and thereafter the secondary switches upon the occurrence of trouble in one of said circuits, and means responsive to the tripping of said switches for initially reclosing after a predetermined time the primary switches and thereafter the secondary switches of the circuits which are free from trouble.

20. In combination with a transformer having primary and secondary leads, switch means operable to open and close the secondary leads, and control means for controlling the closing and opening of said switch, said control means operating to close the switch in response to the energization of the primary of the transformer and open the switch when the current and voltage of the secondary leads have reached a predetermined low value.

21. In combination with a transformer having primary and secondary leads, switch means operable to open and close the secondary leads, and control means for controlling the closing and opening of said switch, said control means operating to close the switch in response to the energization of the transformer primary and open the switch when the transformer load has reached a predetermined low value.

JOSEPH J. SHOEMAKER.
RICHARD E. SCHWARZ.